United States Patent Office 3,265,736
Patented August 9, 1966

3,265,736
4,4-DIAMINO-N-METHYLDIPHENYLAMINES
Edward L. Wheeler, Woodbury, Conn., assignor to United States Rubber Company, New York, N.Y., a corporation of New Jersey
No Drawing. Filed Sept. 25, 1963, Ser. No. 311,338
3 Claims. (Cl. 260—576)

This invention relates to new chemicals which are antiozonants for rubber and to their use in inhibiting the deteriorating effect of ozone on rubber.

It is known that ozone causes surface cracking of conventional rubber vulcanizates when the rubber is under strain. The most severe deterioration occurs when a small number of cracks are formed which grow rapidly at the expense of the formation of new cracks. Such a condition will produce deep, disruptive fissures which seriously shorten the serviceable life of the article. Waxes have been utilized to inhibit ozone cracking in articles under static stress by milling them into the rubber stock before vulcanization; the wax migrates to the surface of the rubber article to form a film which acts as a physical barrier to ozone attack. However, if the article is subjected to dynamic flexing during service the wax film breaks and the article cracks worse than if no wax had been incorporated.

Chemical antiozonants have been developed which retard the formation of ozone cracks during both static and dynamic conditions. Examples of antiozonants now being used are N-isopropyl-N'-phenyl-p-phenylenediamine, N-cyclohexyl - N' - phenyl-p-phenylenediamine, N,N'-dioctyl-p-phenylenediamine, 6-ethoxy-1,2-dihydro-2,2,4-trimethylquinoline and nickel dibutyldithiocarbamate.

I have discovered a new class of organic compounds which are antiozonants for rubber. The compounds have the general formula

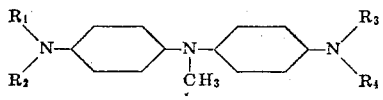

in which $R_1$, $R_2$ and $R_3$ are alkyl radicals having 1 to 8 carbon atoms or cycloalkyl radicals having 5 to 8 carbon atoms, and $R_4$ is a secondary alkyl radical having 3 to 8 carbon atoms or a cycloalkyl radical having 5 to 8 carbon atoms. The chemicals of the present invention are also antioxidants for rubber. The chemicals of the present invention are used as antiozonants and antioxidants for rubber in amounts from 0.1 to 5 parts by weight per 100 parts of rubber.

The chemicals of the present invention may be prepared by reductively alkylating a 4,4'-bis(substituted amino)-N-methyldiphenylamine in which the amino substituents are $R_2$ and $R_4$ in the above general formula with the selected aldehyde in the presence of hydrogen using a hydrogenation catalyst such as palladium-on-charcoal. Such 4,4'-bis(substituted amino)-N-methyldiphenylamines are new chemicals claimed in my copending application filed concurrently herewith and are prepared by reductively alkylating 4,4'-diamino-N-methyldiphenylamine or 4,4'-dinitro-N-methyldiphenylamine with the selected ketone in the presence of hydrogen using a hydrogenation catalyst such as palladium-on-charcoal.

The chemicals of the present invention where $R_3$ is methyl may also be prepared by reductively alkylating 4-disubstituted amino-4'-substituted aminodiphenylamine in which the 4-amino substituents are $R_1$ and $R_2$ and the 4'-amino substituent is $R_4$ in the above general formula with paraformaldehyde in the presence of hydrogen using a hydrogenation catalyst such as palladium-on-charcoal. Such 4-disubstituted amino-4'-substituted aminodiphenylamines are new chemicals claimed in my copending application filed concurrently herewith and are prepared by reductively alkylating the 4-disubstituted amino-4'-nitrodiphenylamine in which the 4-amino substituents are $R_1$ and $R_2$ in the above general formula with the selected ketone in the presence of hydrogen using a hydrogenation catalyst such as palladium-on-charcoal.

Examples of the chemicals of the invention are:

4,4'-bis(N-methyl-N-isopropylamino)-N-methyldiphenylamine
4,4'-bis(N-n-octyl-N-isopropylamino)-N-methyldiphenylamine
4,4'-bis(N-methyl-N-cyclohexylamino)-N-methyldiphenylamine
4-dimethylamino-4'-(N-methyl-N-isopropylamino)-N-methyldiphenylamine
4-diethylamino-4'-(N-methyl-N-sec-butylamino)-N-methyldiphenylamine
4,4'-bis(N-n-butyl-N-isopropylamino)-N-methyldiphenylamine
4-diisopropylamino-4'-(N-methyl-N-isopropylamino)-N-methyldiphenylamine
4,4'-bis(N-ethyl-N-cyclopentylamino)-N-methyldiphenylamine
4-di-n-amylamino-4'-(N-methyl-N-isopropylamino)-N-methyldiphenylamine Examples 1 to 4 illustrate the preparation of the chemicals of the present invention.

EXAMPLE 1

*4,4' - bis(N-methyl-N-cyclohexylamino)-N-methyldiphenylamine*

Into a 1-liter rocking autoclave were charged 51 grams of 4,4' - bis(cyclohexylamino)-N-methyldiphenylamine, 10.6 grams of 95% paraformaldehyde, 240 ml. of methanol, and 1.5 grams of 5% palladium-on-charcoal. The contents were subjected to 400 p.s.i. gauge pressure of hydrogen at 100° C. for 4½ hours with constant agitation. The catalyst was removed by filtering a heated solution. The 4,4'-bis(N-methyl-N-cyclohexylamino)-N-methyldiphenylamine crystallized from the cooled solution in 68% yield; M.P. 62–63° C.

*Analysis.*—Calculated for $C_{27}H_{39}N_3$: C, 80.0; H, 9.69; N, 10.36. Found: C, 80.1; H, 9.69; N, 10.70.

The 4,4'-bis(cyclohexylamino)-N-methyldiphenylamine was prepared as follows:

Into a 1.7-liter rocking autoclave were charged 90 grams of 4,4'-diamino-N-methyldiphenylamine (which was prepared from 4,4'-dinitro-N-methyldiphenylamine), 500 ml. of cyclohexanone, and 2.95 grams of 5% palladium-on-charcoal. The contents while agitated were subjected to 300–500 p.s.i. gauge pressure of hydrogen at 145° C. for ½ hour. The catalyst was removed by filtration and the solvent distilled leaving a residue product which was poured into ethanol, then diluted with water. The crude 4,4'-bis-(cyclohexylamino)-N-methyldiphenylamine was obtained in 76% yield. The recrystallized product melted at 108–110° C.

*Analysis.*—Calculated for $C_{25}H_{35}N_3$: C, 79.5; H, 9.34; N, 11.13. Found: C, 79.9; H, 9.63; N, 11.11.

The 4,4'-dinitro-N-methyldiphenylamine was prepared as follows: Into a 500 ml. 3-neck flask equipped with a thermometer, stirrer, and a Stark and Dean trap filled with benzene, were charged 72 g. of p-nitro-N-methylaniline, 78 g. of p-nitrochlorobenzene, 69 g. of potassium carbonate, and 70 ml. of dimethylformamide. The mixture was heated at 160–170° C. for 29 hours with continuous removal of the water formed. The mixture was cooled, quenched with water, and the resulting precipitate filtered. The precipitate was digested with dilute hydrochloric acid on the steam bath, then after filtering, was treated with hot ethanol. The alcohol insoluble material was filtered. This product was then dissolved in chloroform and filtered. The product was recovered by evaporation of the chloroform to yield 110 g. (86% yield) of 4,4'-dinitro-N-methyldiphenylamine, M.P. 174–176° C. The product was melted at 178–179° C. after recrystallization from aqueous dimethylformamide [see J. Am. Chem. Soc. 74, 1321 (1952)].

The 4,4'-diamino-N-methyldiphenylamine was prepared by reducing the 4,4'-dinitro-N-methyldiphenylamine by hydrogenation in isopropanol at 100° C. and 200–400 p.s.i. gauge pressure of hydrogen in the presence of a palladium-on-charcoal catalyst. The 4,4'-diamino-N-methyldiphenylamine was isolated by removing the catalyst by filtration and evaporating the solvent. The chemical melted at 172.5–174° C. after recrystallization from an ethanol-water mixture.

EXAMPLE 2

*4,4-bis(N-methyl-N-isopropylamino)-N-methyldiphenylamine*

Into a 1-liter rocking autoclave were charged 51 g. of 4,4'-bis(isopropylamino)-N-methyldiphenylamine, 14 g. of 95% paraformaldehyde, 230 ml. of methanol and 1.5 g. of 5% palladium-on-charcoal. The contents were subjected to 300–500 p.s.i. gauge pressure of hydrogen at 65° C. for 2½ hours with constant agitation. The catalyst was removed by filtering a heated solution. The 4,4'-bis(N-methyl-N-isopropylamino)-N-methyldiphenylamine crystallized from the cooled solution in 75% yield. The recrystallized product (from methanol) melted at 67–68° C.

*Analysis.*—Calculated for $C_{21}H_{31}N_3$: C, 77.5; H, 9.60; N, 12.91. Found: C, 77.4; H, 9.65; N, 13.1.

The 4,4'-bis(isopropylamino)-N-methyldiphenylamine was prepared as follows: Into a 1.7-liter rocking autoclave were charged 115 g. of 4,4'-diamino-N-methyldiphenylamine prepared as in Example 1, 500 ml. of acetone, and 3.1 g. of 5% palladium-on-carbon. The contents, while agitated, were subjected to 300–540 p.s.i. gauge pressure of hydrogen at 150–155° C. for 3 hours. After cooling, the hydrogenated charge was removed and the catalyst separated by filtration. The acetone was removed by distillation and the residue product was purified by vacuum distillation. A forerun of 11 g. was obtained: B.P. 170–187° C. (0.4 mm.). The 4,4'-bis(isopropylamino)-N-methyldiphenylamine, B.P. 187–193° C. (0.4 mm.), weighed 113.5 g. (71% yield).

*Analysis.*—Calculated for $C_{19}H_{27}N_3$: C, 76.7; H, 9.15; N, 14.1. Found: C, 76.4; H, 9.13; N, 14.0.

EXAMPLE 3

*4,4'-bis(N-n-octyl-N-isopropylamino)-N-methyldiphenylamine*

Into a 1.7-liter rocking autoclave were charged 40 g. of 4,4'-bis(isopropylamino) - N - methyldiphenylamine prepared as in Example 2, 38.5 g. of octanal, 210 ml. of methanol, and 4.5 g. of 5% palladium-on-charcoal. The contents, while agitated, were subjected to 400–500 p.s.i. gauge pressure of hydrogen at 55° C. for 2½ hours. The catalyst was removed by filtration and the solvent was removed by distillation. The product was separated from the lower boiling impurities by use of a molecular still at 180° C. (0.005 mm.). The residue was the desired 4,4'-bis(N - n - octyl - N - isopropylamino) - N - methyldiphenylamine.

*Analysis.*—Calculated for $C_{35}H_{59}N_3$: C, 80.6; H, 11.4; N, 8.05. Found: C, 80.8; H, 11.2; N, 7.8.

EXAMPLE 4

*4-dimethylamino-4'-(N-methyl-N-isopropylamino)-N-methyldiphenylamine*

Into a 1.7-liter rocking autoclave were charged 74 grams of 4-dimethylamino-4'-isopropylaminodiphenylamine, 26 grams of 95% paraformaldehyde, 400 ml. methanol and 5.0 grams of 5% palladium-on-charcoal. The contents while agitated were subjected to 300–500 p.s.i. gauge pressure of hydrogen at 70° C. for one hour. After cooling, the hydrogenated charge was removed and the catalyst separated by filtration. The solvent was removed by distillation, and the 4-dimethylamino-4'-(N-methyl-N-isopropylamino)-N-methyldiphenylamine residue product was purified by vacuum distillation. The fraction boiling at 179–183° C. (0.4 mm.) weighed 61 grams (75% yield).

*Analysis.*—Calculated for $C_{19}H_{27}N_3$: C, 76.7; H, 9.15; N, 14.13. Found: C, 76.9; H, 9.33; N, 14.19.

The 4-dimethylamino-4'-isopropylaminodiphenylamine was prepared as follows: Into a 1.7-liter rocking autoclave were charged 100 g. of 4-dimethylamino-4'-nitrodiphenylamine, 500 ml. of acetone, and 3.0 g. of 5% palladium-on-charcoal. The contents, while agitated, were subjected to 300–500 p.s.i. gauge pressure of hydrogen at 130–135° C. for 2½ hours. The catalyst was removed by filtration, and the solvent was removed by distillation. Distillation of the 4-dimethylamino-4'-isopropylaminodiphenylamine yielded 76 g. (72.5%); B.P. 190–200° C. (0.6 mm.).

*Analysis.*—Calculated for $C_{17}H_{23}N_3$: C, 75.7; H, 8.61, N, 15.6. Found: C, 75.8; H, 8.60; N, 15.6.

The 4-dimethylamino-4'-nitrodiphenylamine was prepared as follows: A mixture of 295 g. of N,N-dimethyl-N'-formyl-p-phenylenediamine (Beil., XIII, 94), 236 g. of p-nitrochlorobenzene, 150 g. of anhydrous potassium carbonate, and 150 ml. of dimethylformamide was heated at 160–170° C. for 5½ hours with continuous removal of the water formed in the reaction. The reaction mixture was cooled, poured into water, and the resulting precipitate was filtered, washed successively with dilute hydrochloric acid, ethanol, and finally with a mixture of hot benzene and hexane. 222 g. of 4-dimethylamino-4'-nitrodiphenylamine was obtained, M.P. 145–150° C. Recrystallization of the product from nitromethane yielded material with a melting point of 151.0–152.5° C.

*Analysis.*—Calculated for $C_{14}H_{15}N_3O_2$: C, 65.4; H, 5.88; N, 16.3. Found: C, 65.3; H, 6.08; N, 16.2.

The chemicals of the present invention are antiozonants for rubbers, such as natural rubber and synthetic rubbers, and mixtures thereof. The synthetic rubbers may be the products of aqueous emulsion polymerizations with a peroxide catalyst of various rubber-forming monomers. Such synthetic rubbers may be polymers of butadienes-1,3, e.g. butadiene-1,3, 2-methylbutadiene-1,3 (isoprene), 2-chlorobutadiene-1,3 (chloroprene), 2,3-dimethylbutadiene-1,3, piperylene, and copolymers of mixtures thereof, and copolymers of mixtures of one or more such butadienes-1,3 with up to 70% of such mixtures of one or more monoethylenic compounds which contain a $CH_2\!=\!C\!<$ group where at least one of the disconnected valences is attached to an electro-negative group, that is a group which substantially increases the electrical dissymmetry or polar character of the molecule. Examples of such monoethylenic compounds, which are copolymerizable with butadienes-1,3, are aryl olefins, such as styrene, vinyl naphthalene, alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines, such as 2-vinyl pyridine, 2-methyl-5-vinyl pyridine; vinyl carbazole. Commercial synthetic rubbers of this type are SBR (copolymer of a major proportion of butadiene and a minor proportion of styrene) and NBR (copolymer of a major proportion of butadiene and a minor proportion of acrylonitrile). The synthetic rubber may also be a 1,4-polybutadiene or a 1,4-polyisoprene, prepared by solution polymerization. Such 1,4-polybutadiene may be made by solution polymerization of butadiene-1,3 in the presence of a catalyst reaction product of an aluminum trialkyl, such as aluminum triethyl, and titanium iodide. Such 1,4-polyisoprene may be made by solution polymerization of isoprene in the presence of a catalyst reaction product of an aluminum trialkyl, such as aluminum triisobutyl, and titanium tetrachloride. The synthetic rubber may also be the product of the solution polymerization of a mixture of a major proportion of isoolefin and a minor proportion of conjugated diene at low temperature in the presence of a Friedel-Crafts polymerization catalist of the type of aluminum chloride or boron trifluoride. An example of a commercial synthetic rubber of this type is butyl rubber which is a copolymer of about 95 to 99 parts of isobutylene and correspondingly 5 to 1 parts of isoprene. The synthetic rubber may also be the product of the solution polymerization of a mixture of ethylene and at least one alpha olefin having the formula $CH_2=CHR$ in which R is an alkyl radical having 1 to 8 carbon atoms, e.g. propylene, with, if desired, a minor proportion of a non-conjugated diene, such as 1,4-hexadiene or dicyclopentadiene, in the presence of a catalyst reaction product of aluminum trialkyl, and titanium tetrahalide or vanadium tetrahalide or vanadium oxytrihalide, e.g. the reaction product of aluminum tridecyl and vanadium oxytrichloride. An example of a synthetic rubber of this type is a terpolymer of about 55% propylene, 41% ethylene and 4% 1,4-hexadiene.

The new antiozonants may be used in combination with waxes and other antiozonants. They may be used in rubber stocks with the usual compounding ingredients, e.g., vulcanizing agents, accelerators, activators, retarders, antioxidants, softeners, and reinforcing agents.

Examples 5 to 8 illustrate the effectiveness of the chemicals of the present invention as antiozonants and antioxidants for rubber.

EXAMPLE 5

The compounds of this invention were evaluated for their antiozone activity in a modification of the test of A. D. Delman, B. B. Simms and A. R. Allison as described in Analytical Chemistry, vol. 26, 1589 (1954). In this test the ability of the compounds to retard the scission of rubber molecules in solution by ozone is determined by measuring the percent of initial viscosity of the polymer solution retained after successive periods of subjection to a regulated stream of ozone of constant concentration. It has been well demonstrated that there is a correlation between the results of this test and actual rubber tests, taking into account such factors as the reactivity of the test compound with the other rubber compounding ingredients, loss by volatility, rates of migration of the chemical. In the modification of the test by which the compounds of this invention were evaluated, a solution of 1.25 grams of SBR (copolymer of about 77 parts by weight of butadiene and 23 parts by weight of styrene) previously extracted with a mixture of ethanol-toluene-water in the ratio 50:40:10, and 0.125 gram of test compound in 250 ml. of o-dichlorobenzene was ozonized at room temperature with a stream of air containing 250 p.p.m. of ozone by volume at a rate of 0.02 cubic meter per hour. The measurements of the viscosity of the solutions at 30° C. were made before the start of the ozonization and after each hour for six hours, and from these data the percent of initial viscosity retained after each hour was calculated. The results are given in the following table.

| Chemical | Percent Initial Viscosity Retained After— | | | | | |
|---|---|---|---|---|---|---|
| | 1 hr. | 2 hr. | 3 hr. | 4 hr. | 5 hr. | 6 hr. |
| None | 36.2 | 16.8 | | | | |
| 4,4'-Bis(N-methyl-N-isopropylamino)-N-methyldiphenylamine | 92.0 | 84.6 | 73.8 | 61.1 | 48.3 | 28.5 |
| 4,4'-Bis(N-n-octyl-N-isopropylamino)-N-methyldiphenylamine | 80.7 | 55.7 | 33.3 | | | |
| 4,4'-Bis(N-methyl-N-cyclohexylamino)-N-methyldiphenylamine | 90.7 | 80.7 | 70.0 | 53.3 | 39.3 | 22.7 |
| 4-dimethylamino-4'-(N-methyl-N-isopropylamino)-N-methyldiphenylamine | 92.7 | 84.2 | 74.6 | 60.6 | 43.6 | 24.9 |

EXAMPLE 6

The ability of the chemicals of the present invention to retard the formation of ozone cracks in cured rubber was determined in the following recipe for the rubber stocks.

Parts by weight
SBR 1500 (copolymer of about 77 parts by weight
  of butadiene and 23 parts by weight of styrene)_ 100.0
Zinc oxide _____ 3.0
HAF carbon black _____ 40.0
EPC carbon black _____ 10.0
Stearic acid _____ 1.5
Saturated polymerized petroleum hydrocarbon
  plasticizer (Para-Flux 2016) _____ 3.5
Naphthenic type oil (Circo Light Process Oil) ___ 3.5
N-cyclohexyl-2-benzothiazolesulfenamide _____ 1.25
Sulfur _____ 2.0
Antiozone test chemical _____ 2.0

Looped test specimens of the stocks cured for 45 minutes at 292° F. were prepared according to Procedure B (Exposure of Looped Specimens) of ASTM Method D518–57T (Resistance to Surface Cracking of Stretched Rubber Compounds). Specimens were subjected to outdoor exposure on a roof at an angle of 45 degrees facing south. The specimens were observed after appropriate intervals on the roof, and the time recorded to the appearance of cracks corresponding to those having a rating number of 3 in ASTM Method D1171–59 (Test for Weather Resistance Exposure of Automotive Rubber Compounds). The days required to crack to a rating number of 3 are given in the following table.

Chemical:                                                    Days
    None _____ 4
    4,4'-bis(N-n-octyl-N-isopropylamino)-N-
      methyldiphenylamine _____ 74
    4-dimethylamino-4'-(N-methyl-N-isopropyl-
      amino)-N-methyldiphenylamine _____ 50

EXAMPLE 7

In a dynamic flexing test, molded stocks of the recipe of Example 6, ½" x 6" x ¼" having a ⅛" radius circular groove across the center were cured for 45 minutes at 292° F. They were mounted outdoors facing south and flexed through a 78 degree angle at about 8.5 kilocycles per hour. Observations were made after appropriate intervals and the number of kilocycles recorded to the appearance of cracks corresponding to those having a rating number of 3 in ASTM Method D1171–59. Both unaged stocks and stocks which had been heat aged at 158° F. for 7 days were tested. The number of kilocycles required to crack to a rating number of 3 are given in the following table.

| Chemical | Kilocycles To Crack ||
| --- | --- | --- |
| | Unaged | Aged 7 days/158° F. |
| 4,4'-bis(N-methyl-N-isopropylamino)-N-methyldiphenylamine | 18,732 | 30,363 |
| 4,4'-bis(N-n-octyl-N-isopropylamino)-N-methyldiphenylamine | 8,832 | 6,792 |
| 4,4'-bis(N-methyl-N-cyclohexylamino)-N-methyldiphenylamine | 8,832 | 6,792 |
| 4-Dimethylamino-4'-(N-methyl-N-isopropylamino)-N-methyldiphenylamine | 29,000 | 30,363 |
| None | 840 | 2,260 |

EXAMPLE 8

The ability of the chemicals of the present invention to inhibit the bulk oxidation of natural rubber was determined. In the following recipe,

| | |
| --- | --- |
| Smoked sheets | 100.0 |
| Zinc oxide | 5.0 |
| ISAF carbon black | 45.0 |
| Pine tar | 4.5 |
| Stearic acid | 4.5 |
| N-cyclohexyl-2-benzothiazole-sulfenamide | 0.5 |
| Sulfur | 2.5 |
| Antioxidant test chemical | 2.0 | the rubber stocks were cured for 60 minutes at 292° F. The retention of tensile strength after aging in oxygen for 96 hours at 70° C. demonstrates the effectiveness of these chemicals as antioxidants. The results are shown in the following table.

| | Tensile Strength |||
| --- | --- | --- | --- |
| | Unaged (lbs./sq. in.) | Aged (lbs./sq. in.) | Percent Retained |
| 4,4'-Bis(N-methyl-N-isopropylamino)-N-methyldiphenylamine | 4,000 | 1,810 | 45 |
| 4-Dimenthylamino-4'-(N-methyl-N-isopropylamino)-N-methyldiphenylamine | 4,190 | 1,830 | 44 |
| None | 4,120 | 340 | 8 |

It may be seen from the above table that the chemicals of the present invention are also antioxidants.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A compound having the general formula

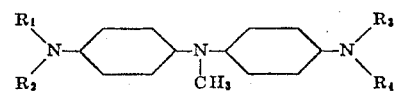

in which $R_1$, $R_2$ and $R_3$ are selected from the group consisting of alkyl radicals having 1 to 8 carbon atoms and cycloalkyl radicals having 5 to 8 carbon atoms, and $R_4$ is selected from the group consisting of secondary alkyl radicals having 3 to 8 carbon atoms and cycloalkyl radicals having 5 to 8 carbon atoms.

2. A 4,4' - bis(N-alkyl-N-isopropylamino)-N-methyldiphenylamine in which the alkyl radicals have 1 to 8 carbon atoms.

3. A 4,4' - bis(N-alkyl-N-cyclohexylamino)-N-methyldiphenlyamine in which the alkyl radicals have 1 to 8 carbon atoms.

References Cited by the Examiner

UNITED STATES PATENTS

| | | | |
| --- | --- | --- | --- |
| 2,494,059 | 1/1950 | Ruggles | 260—576 |
| 2,984,646 | 5/1961 | Wilson | 260—45.9 |
| 3,014,967 | 12/1961 | Chapman | 260—576 |
| 3,157,615 | 11/1964 | Stahly | 260—45.9 |

CHARLES B. PARKER, *Primary Examiner.*

ROBERT V. HINES, *Assistant Examiner.*